April 12, 1932. J. A. HEALY 1,853,611
CONTROLLED CONVEYING AND FEEDING OF ABRASIVES
Filed April 5, 1930
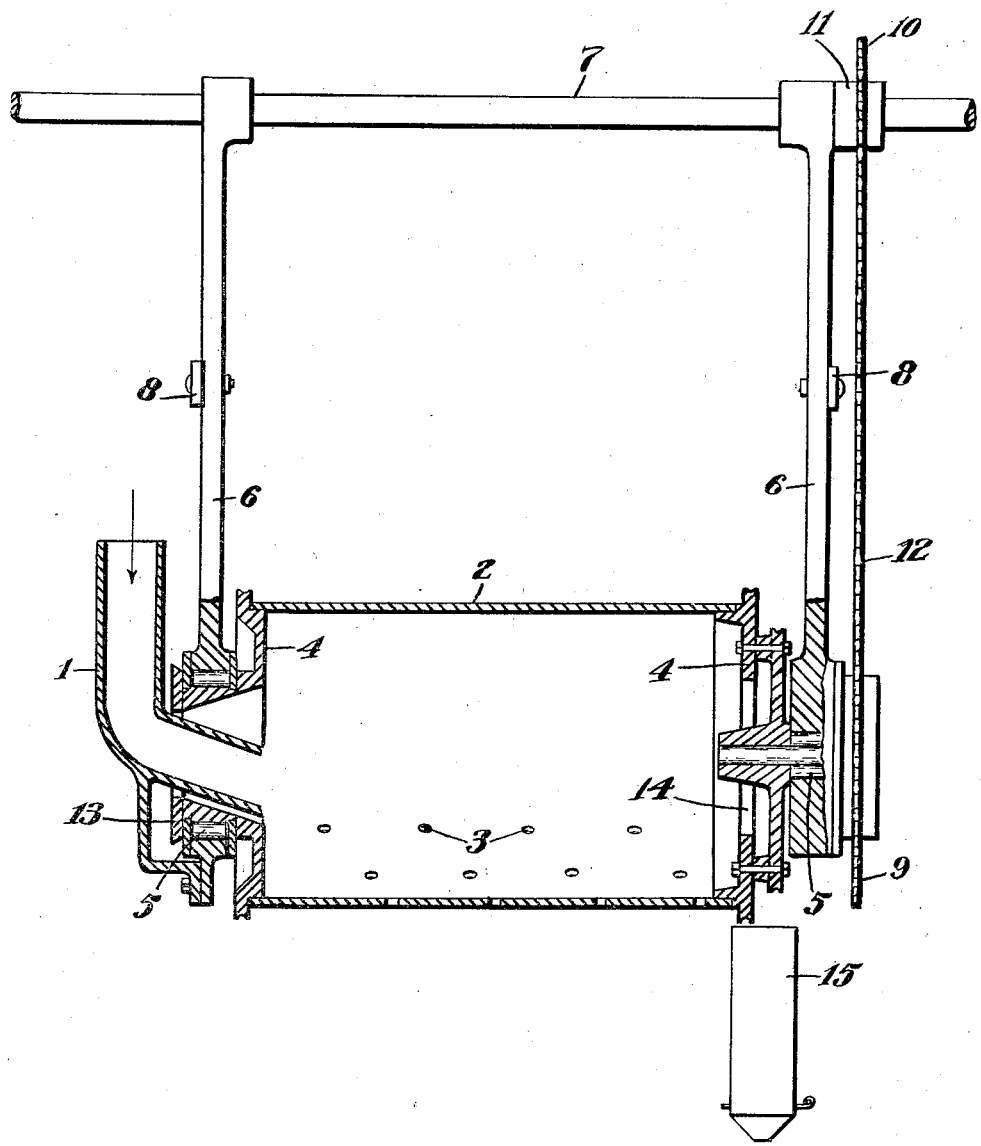
Inventor
Joseph Alfred Healy
Ellis Spear Jr.
By Attorney Patented Apr. 12, 1932

1,853,611

UNITED STATES PATENT OFFICE

JOSEPH ALFRED HEALY, OF BARRE, VERMONT

CONTROLLED CONVEYING AND FEEDING OF ABRASIVES

Application filed April 5, 1930. Serial No. 442,005.

In the sawing or dressing of stone and the like with abrasives, the conveyance and feed of the abrasive, as the important service element in the operation, from its place of storage to the sawing or dressing instrumentality, as a gang saw or polishing wheel, has been more or less haphazard with the result that there was no real control of the abrasive according to the requirements of the particular piece of work being performed.

Frequently, the matter of abrasive feed is left to the judgment of the particular workman who simply shovels the abrasive onto the work whenever and in such quantities as he considers necessary.

Where automatic feed has been attempted, and particularly in the case of the stone saw, an elaborate system of conveyors and elevators have been necessary for conveying the abrasive to the saw.

When the abrasive used is sand, as in sawing marble, it is feasible to feed by means of a pump. Sand, however, does not make a satisfactory abrasive for such stones as granite, for example, which requires an abrasive consisting of chilled steel shot with water.

Although attempts have been made to pump such an abrasive, they have not been wholly satisfactory, due to the impossibility of obtaining a uniform feed, and hence a uniform cutting action. Where this type of abrasive has been pumped to a saw, for example, it was necessary to pump the abrasive into an overhead tank from which it flowed onto a perforated platform and was spread onto the top of the block being worked upon. This made for non-uniformity of feed, and usually an under feed of abrasive, due to the fact that the abrasive could not be pumped into the tank without carrying along with it a considerable quantity of water, mud, and cuttings.

Where chilled shot is used as an abrasive with water as in the sawing or dressing of granite or other stone, several factors are involved, all having a mutual bearing upon one another and all individually and collectively affecting the ultimate result. For example, the material being operated upon, the machine being used, and particularly the blade and shape and spacement of the teeth if a saw, the abrasive and its application, and the water and its control are all contributing factors.

As heretofore indicated, with all prior methods used in the industry, so far as I am aware, the lack of control of the water and abrasive has been the principal cause of the non-uniformity of feed and hence non-uniformity in dressing or cutting action which has characterized such prior art practices. Accordingly, the concept underlying my present invention is that of so conveying and feeding the abrasive as positively and accurately to permit of its control at all times and under all conditions of use, according to the particular material being operated upon and the particular type of operating instrumentality.

For the purposes of this application I shall discuss my invention in its adaptation to a gang saw, although it will be understood that this treatment is purely illustrative and in no way limiting, and that the principles of my invention may be applied to any saw wherein the abrasive is fed to the saw blade or blades while the saw is at work, or to any grinding or dressing instrumentality using an abrasive, as for example, a polishing wheel.

Considering the gang saw as typical of the problems involved, however, it will be evident that an adequate and uniform feed of the abrasive to the several saw blades must be maintained at all times and in all positions of the blades, and that unless such feed is adequate, the cutting action will not be uniform.

With these considerations in mind, I have approached the problem from the point of view of positively controlling the conveyance and feed of the abrasive to the saw or other instrumentality, such positive control applying not only to the admission of the abrasive and water to the distributing member but to the discharge thereof as well as onto the work according to the particular operating conditions prevailing.

In carrying out my invention, I depart sharply from prior practice in my use of a rotating distributing member from which the abrasive is fed to the saw or other instrumentality. Such member may take the form of a drum, tank or similar receptacle disposed above the work for movement about a fixed axis relative thereto.

As is well known in the art, chilled shot, and sand, carborundum or like granular abrasives, with or without water, will not flow freely in a stationary receptacle, but on the contrary will pile up at the intake and choke the receptacle, but this deficiency is instantly overcome when the receptacle is rotated or oscillated about its axis in which event the abrasive seeks its own level as would water. Such movement may be a simple rotary movement or the drum may be both rotated and oscillated relative to the work.

My invention takes advantage of this well known principle, and accordingly I have provided for either rotating or oscillating, or both, the distributing receptacle over the work. The rotary motion prevents choking up of the drum with the abrasive and the oscillating motion insures adequate distribution of the abrasive to all points of the saw blade or blades.

The abrasive and water is admitted under controlled conditions into one end of the rotating receptacle, and is discharged onto the work through a slot or slots or a row or series of rows of perforations formed in the circumference of the drum intermediate of the ends thereof, the excess abrasive not discharged through said openings being carried off through a suitable overflow opening at the opposite end of the drum.

The level of the abrasive and water in the drum is controlled by the size of the overflow opening, and the quantity of abrasive and water discharging onto the saw or other instrumentality is controlled by the size and number of discharge perforations. If additional water for the purpose of cooling the blade or blades is necessary, this may be supplied by means of an independent sprinkler with regulating valve.

By regulating the size, spacement and number of discharge openings, the arc of swing if the receptacle is oscillated as well as rotated and rate of rotation, I am enabled to secure a feed of the abrasive to the saw or other instrumentality which is uniform at all points in the stroke of the saw and to all of the saw blades, if a gang saw.

My improvements are applicable to saws or other grinding, polishing, or dressing machines of standard type without modification or reorganization of structure.

In the drawing:—

The single figure is an elevation, partly in section, of a form of apparatus which I have found entirely satisfactory for the practice of my invention.

The chilled shot or other abrasive and the water is fed in any suitable manner into the elbow 1 of a distributing receptacle 2 which is supported above the work for either rotary or rotary and oscillatory motion, relative thereto.

Such receptacle may be a cylindrical or otherwise shaped body, perforated or otherwise opened intermediate of its ends, to provide one or more abrasive discharge openings 3. The end closures or heads 4 of the receptacle may be mounted in roller bearings 5 at the lower ends of a pair of rocker arms 6 on a shaft which if the receptacle is to oscillate as well as rotate may conveniently be a rock shaft 7. The rock shaft 7 may be rocked in any suitable manner as by the actuating members 8.

In addition to the rocking motion imparted to it from the rock shaft 7, the drum may be rotated from any suitable power source and by any suitable motion transmitting connections. As here shown, I have provided a simple sprocket and chain drive for the drum, the sprocket 9 being fast on the drum and the sprocket 10 being carried by a sleeve 11 running loose on the shaft 7 and driven by any suitable belt (not shown). The sprocket chain is indicated at 12.

The hub of sprocket 9 may serve as an end thrust bearing for one end of the drum, and end thrust at the opposite end may be taken care of as at 13.

For some purposes it may be unnecessary to rock the drum, in which event the rocker arms 6 will fit loosely on the rock shaft 7.

Similarly, it may be desirable for some purposes to incline the drum relative to the work, and this may be taken care of in any obvious manner. For most purposes, however, a horizontally disposed drum is entirely satisfactory.

In use, the shot and water, or other abrasive, is fed continuously into the intake end of the drum as at 1 and such of the abrasive as is not discharged onto the saw blades through the perforations 3 escapes through the overflow opening 14 at the opposite end of the drum into the hopper 15 from which it is returned in any suitable manner to the intake 1. Preferably, although not necessarily, the overflow 14 is in the form of a plurality of spaced openings in the adjacent head 4 of the drum.

The rotation of the drum insures adequate distribution of the abrasive without choking or piling up throughout the entire length thereof and the perforations 3 permit controlled discharge of the abrasive and water onto the saw blade or blades.

The oscillatory motion of the drum if the drum is also oscillated insures adequate distribution of the abrasive to all points in the stroke of the saw blade or blades without any tendency to over-feed at the center and under-feed at the ends of the stroke.

Where used with a gang saw, there will preferably be one row of perforations 3 for each blade of the saw, and these perforations may be staggered relative to each other in parallel rows as shown, although such arrangement is optional.

The abrasive level may be any desired level but must be deep enough to keep the discharge perforations 3 covered with abrasive.

The overflow at 14 maintains the level constant or substantially constant, regardless of variations in rate of feed or discharge, and the rotation of the drum prevents choking up. Moreover, the shot is in a condition of continual agitation in the water and hence is washed and kept clean thereby.

Thus by the use of a rotating abrasive receptacle with abrasive intake at one end, overflow at the opposite end, and abrasive discharge to the work intermediate of said ends, I secure a control of the abrasive and water never before attained in the art. Moreover, I avoid the necessity for any elaborate and complicated systems of conveying and feeding, the drum itself being at once both a conveyor and a feeder.

As before indicated, some uses may not require that the drum be oscillated, and accordingly this feature is to be regarded as optional, depending upon the particular installation contemplated.

While the adaptation for a gang saw is typical the invention is in no way limited to such use alone, being in fact usable for the conveying and feeding under conditions of positive control of any abrasive to any cutting, sawing, polishing or grinding machine using abrasive.

It will also be understood that instead of a row or rows of perforations for the discharge of the abrasive onto the work, I may discharge through a slot or slots, or any other equivalent discharge opening or openings formed in the drum.

Similarly, whether perforations or slots are employed, these may extend wholly or only partly around the circumference of the drum and may be staggered with respect to each other, or may be extended spirally or otherwise arranged, as circumstances require.

These, and all such variations in method and apparatus are to be regarded as within the spirit and scope of my invention, as defined by the appended claims.

What I therefore claim and desire to secure by Letters Patent is:

1. Apparatus for feeding abrasive material to a tool comprising a receptacle adapted to be mounted above the tool and into which the abrasive material is adapted to be introduced, said receptacle having one or more apertures therein through which the abrasive material is adapted to be delivered from the receptacle to the tool, means for rotating the receptacle to level the abrasive material supplied thereto, the receptacle having inlet opening means of relatively large size such that abrasive may be supplied to the receptacle faster than it is discharged therefrom through the delivery opening or openings therein, the receptacle also having overflow opening means of relatively large size such that any abrasive material supplied to the receptacle in excess of that discharged through the delivery opening or openings finds a ready exit from the receptacle, whereby the level of the abrasive material within the receptacle and thereby the feed of the abrasive material to the tool is adapted to be maintained uniform.

2. Apparatus as set forth in claim 1 in which the overflow opening means is of greater capacity than the inlet opening means whereby abrasive material cannot be supplied to the receptacle in such quantities as to raise the predetermined abrasive level within the receptacle.

3. Apparatus as set forth in claim 1 in which the receptacle is in the form of a horizontally disposed cylinder having the discharge opening or openings in the side thereof and the inlet and overflow opening means in the ends thereof, respectively.

4. Apparatus as set forth in claim 1 in which the receptacle is mounted for movement bodily to different operative positions relative to the tool.

5. Apparatus as set forth in claim 1 in which the receptacle is pivotally suspended for swinging movement bodily to different operative positions relative to the tool.

In testimony whereof I affix my signature.

J. ALFRED HEALY.